May 17, 1966  G. J. ERICKSON  3,251,955
CURRENT TRANSMITTING ARRANGEMENT FOR INSTRUMENTS
Filed Sept. 3, 1963  2 Sheets-Sheet 1

INVENTOR.
GOFFE J. ERICKSON
BY Roger W. Jensen
ATTORNEY

May 17, 1966  G. J. ERICKSON  3,251,955
CURRENT TRANSMITTING ARRANGEMENT FOR INSTRUMENTS
Filed Sept. 3, 1963  2 Sheets-Sheet 2

INVENTOR.
GOFFE J. ERICKSON
BY
Roger W. Jensen
ATTORNEY

United States Patent Office 3,251,955
Patented May 17, 1966

3,251,955
CURRENT TRANSMITTING ARRANGEMENT
FOR INSTRUMENTS
Goffe J. Erickson, St. Anthony Village, Minn., assignor to Honeywell Inc., a corporation of Delaware
Filed Sept. 3, 1963, Ser. No. 306,209
4 Claims. (Cl. 191—12)

This invention pertains to sensitive instruments and more particularly to means for increasing the accuracy thereof.

The applicant's invention has special application to inertial grade sensitive instruments such as a single axis floated gyroscope, however, it is not limited to this application. The applicant's invention will be explained with reference to a single axis floated gyroscope.

A single axis floated gyroscope comprises a rotatable (gimbal) element mounted within a housing means for substantially unrestrained, limited rotation therebetween about an output axis. An electrically driven rotor is mounted within the gimbal element for rotation about a spin axis which is perpendicular to the output axis. An angular velocity about the input axis of the gyro results in a precession of the gimbal element about the output axis relative to the housing means. The magnitude of rotation of the gimbal element about the output is indicative of the angular velocity about the input axis and provides a useful output signal.

The electrical energy necessary to rotate the rotor is conducted from the stationary housing means to the rotatable gimbal element by means of a plurality of flexible leads. In the ideal case, the rotation of the gimbal element is unaffected by the flexible leads. As a practical matter, prior art flexible leads substantially affect the accuracy and sensitivity of the gyroscope. The most common type of prior art flexible lead is semi-circular in shape so as to have sufficient length to allow limited rotation in either direction between the gimbal element and the housing means. A plurality of semi-circular flexible leads are generally utilized and all of the flexible leads lie in a single plane perpendicular to the axis of rotation of the gimbal element.

Since the amount of rotation of the gimbal element constitutes the output signal of the gyro, any torques acting upon the gimbal element either restraining rotation or causing rotation thereof, produces an erroneous output signal. These error producing torques are divided into two categories: acceleration sensitive torques and non-sensitive torques. An example of an acceleration sensitive torque is the torque applied about the output axis to the mass unbalance of the gimbal element. Non-acceleration sensitive error producing torques include torques due to pickoff and torquer magnetics, flexible lead torques and spin-motor reaction torques. However, a very large percentage of the total non-acceleration sensitive error torques acting upon the gimbal element is contributed by the flexible leads. That is, the gyroscope is so accurate that the prior art flexible leads exert torques tending to rotate the gimbal element about the output axis and exert torques tending to restrain rotation of the gimbal element about the output axis thereby limiting the accuracy and sensitivity of the gyroscope.

The applicant's invention comprises a unique flexible lead or flexible conductor or flexible current carrying means which substantially reduces the torques exerted upon the gimbal element by the flexible leads. The applicant's flex lead design positions the ends of the flexible lead at a particular location relative to the output axis which is determined by an attachment angle and an attachment ratio. This design also axially spaces the ends of the flex lead along the output axis so as to permit the utilization of a plurality of flexible leads.

The scope of the invention will become apparent from a study of the accompanying specification and claims in conjunction with the drawings in which:

Figure 1:
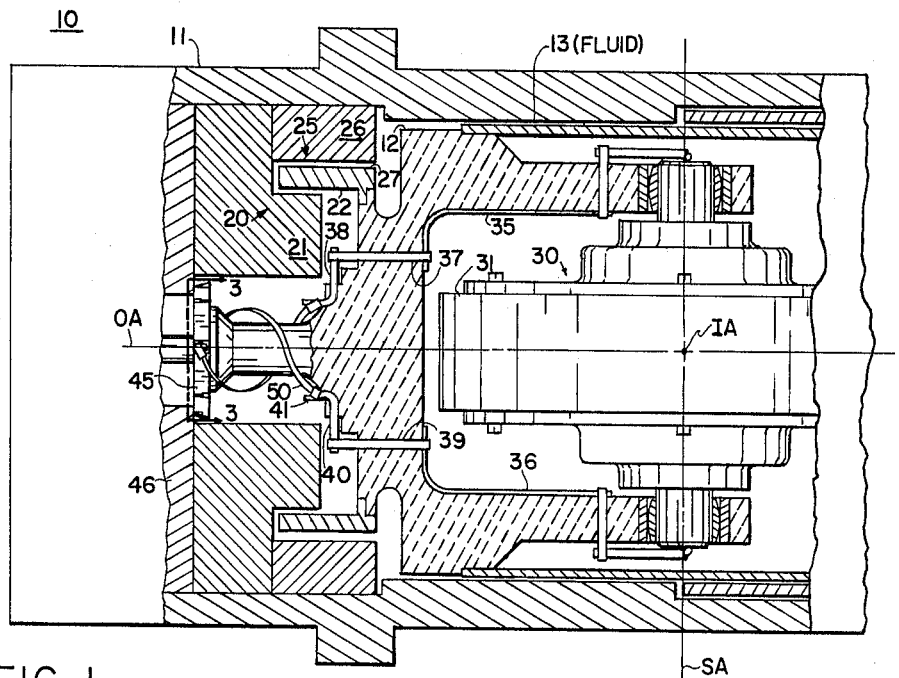
FIGURE 1 is a partial cross sectional view of a floated gyroscope utilizing the applicant's invention.

Referring now to FIGURE 1, reference numeral 10 represents a floated gyro. Gyro 10 includes a generally cylindrical, hollow housing member 11. A generally cylindrically shaped rotatable or gimbal element 12 is mounted within housing means 11 for limited rotation therebetween. Gimbal element 12 is hydrostatically supported for rotation about an output axis OA by a fluid 13 which surrounds gimbal element 12. Fluid 13 is maintained at the proper pressure to support gimbal element 12 by means of a pumping assembly (not shown).

The output axis OA of gyro 10 is perpendicular to a spin axis SA of the gyro. Output axis OA and spin axis SA are mutually perpendicular to an input axis IA of gyro 10. An input rate (angular velocity) about input axis IA of gyro 10 results in a precession of gimbal element 12 about the output axis OA relative to housing means 11.

In order to detect the rotation of gimbal element 12 about the output axis OA, pickoff means 20 are provided. Pickoff means or signal generator means 20 comprises a laminated stator assembly 21 and a rotor 22. Stator assembly 21 is rigidly attached to housing means 11 by suitable means (not shown). Rotor 22 is a cup-shaped assembly rigidly attached to gimbal element 12 by suitable means (not shown) and adapted to be rotated therewith. Pickoff means 20 functions to provide a signal indicative of the rotation of gimbal element 12 about output axis OA which is indicative of the input rate applied about input axis IA. Pickoff means 20 forms no part of the applicant's invention and need not be described in any greater detail.

A torque generator 25 is provided in gyro 10. Torque generator 25 comprises a permanent magnet 26 and a moving coil 27. Permanent magnet 26 is rigidly attached to housing means 11 by a suitable means (not shown). Moving coil 27 is mounted upon cup-shaped rotor element 22 which is attached to gimbal element 12. Torque generator 25 functions to apply a torque to gimbal element 12 about the output axis OA tending to return gimbal element 12 to its original or null position relative to housing element 11. Torque generator 25 forms no part of the present invention and need not be described in any greater detail.

A spin motor assembly 30 is mounted within gimbal element 12. Spin motor assembly 30 includes a rotor (not shown) hydrodynamically mounted within spin motor casing 31 for rotation about spin axis SA. The rotor is actually an armature member of an inside-out electric motor. The rotor is caused to rotate when the motor windings (not shown) are energized from a suitable power source (not shown). Gyro rotors of this type are well known to those skilled in the art and no further description thereof is deemed necessary.

The motor windings are energized through a plurality of motor leads, two of which are illustrated in FIGURE 1 and identified by reference numerals 35 and 36. A pin 37 is positioned through the end of gimbal means 12 and electrically connects motor lead 35 to a terminal element 38 located on the outside of gimbal means 12. A pin 39 electrically connects motor lead 36 to another terminal element 40 located on the outside of gimbal means 12.

A disc-shaped terminal assembly 45 is rigidly attached to an end wall 46 of gyro 10. End wall 46 is rigidly attached to housing means 11. Thus, terminal assembly 45 is fixed relative to housing means 11. As is illustrated in FIGURE 1, terminal assembly 45 is axially spaced along output axis OA from a plane perpendicular to output axis OA containing terminal elements 38 and 40.

Figure 3:
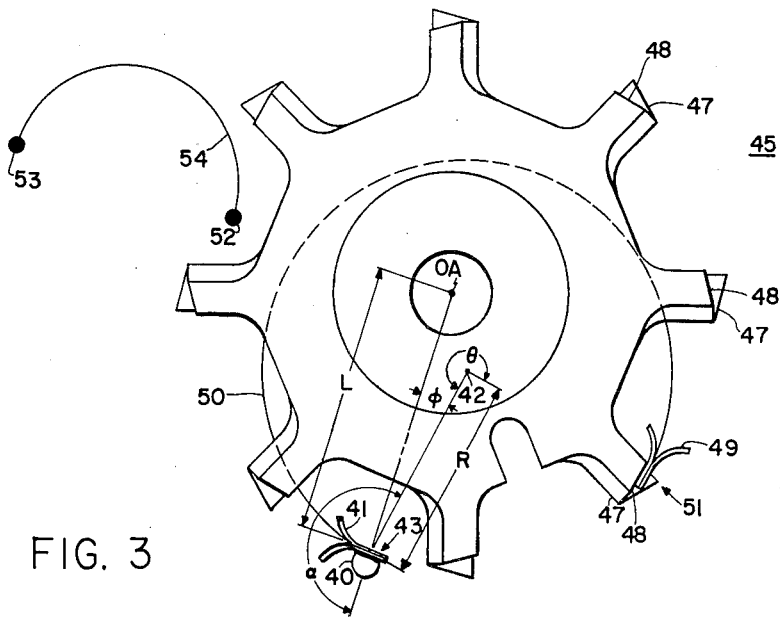
FIGURE 3 is an enlarged cross section view taken along section line 3—3 of FIGURE 1.

Terminal assembly 45 is illustrated in a plan view in FIGURE 3 as a generally circular element having eight integral spoke portions 47 extending therefrom and equally spaced about output axis OA. Each spoke portion 47 has a shoulder 48 thereon contiguous the end thereof. Each shoulder 48 functions as a mounting surface for a flexible lead clip 49. For reasons of clarity, only a single flex lead clip 49 is illustrated as attached to terminal assembly 45 in FIGURE 3. However, it should be understood that in practice eight flex lead clips are attached to terminal assembly 45. A flex lead clip 41 is also attached to terminal element 40. Flex lead clips 41 and 49 provide a means of attaching a flexible lead to terminal 40 and to terminal assembly 45. Flex lead clips 41 and 49 also function to limit the radius of deflection of the flexible lead so as to prevent overstressing the flexible lead proximate the terminal when the gyro is subjected to a low temperature environment.

A helically shaped flexible lead 50 connects terminal 40 to terminal assembly 45 (see also FIGURE 1). Only a single flexible lead is illustrated in FIGURE 3 and only two are illustrated in FIGURE 1, however eight such flexible leads are utilized in gyro 10. It will be noted that flexible lead 50 partially surrounds output axis OA and extends 270° around its center of radius 42. Flexible lead 50 is illustrated in the null position; it is clear that gimbal terminal 40 can rotate about output axis OA a limited amount in either direction.

A single prior art flex lead is also illustrated in FIGURE 3 for purposes of comparison of its position relative to the output axis OA with the position of the applicant's unique flex lead relative to the OA. A terminal 52 is illustrated which is attached to a gimbal element for limited rotation about output axis OA. A terminal 53 is illustrated which is attached to the gyro housing and fixed relative to output axis OA. Note that terminals 52 and 53 lie on a straight line which intersects output axis OA. A semi-circular flexible lead 54 electrically connects terminals 52 and 53. Prior art flexible lead 54 lies wholly within the plane of the drawing (FIGURE 3). Flexible lead 54 is illustrated in the null condition.

While flexible lead 54 is acceptable for some instruments, it exerts various error torques upon the gimbal element. One of the largest torques imposed upon the gimbal by prior art flex lead 54 is the gimbal restraining torque or elastic restraint. A characteristic measurement would be approximately .2°/hr./mr. Another significant torque attributable to the prior art flex lead is the reaction torque. This is the torque exerted upon the gimbal element by the flex lead when the gimbal is in the electrical null position. Another torque is the deformation torque which is imposed upon the gimbal element when the flex lead is deformed or kinked and subsequently stress relieves itself. The hysteresis of the prior art flex lead also results in a torque applied to the gimbal element. Furthermore, the prior art flex lead has its center of mass located at a point spaced from the output axis so that a torque is applied to the gimbal upon acceleration of the gyro along an axis parallel to the output axis OA.

As previously indicated, the applicant has provided a unique flexible lead design wherein a current is supplied between two relatively movable members through a flexible lead which has a negligible effect upon the movement therebetween. The design of the applicant's unique flexible lead can be defined in terms of an attachment angle $\alpha$ and an attachment ratio $L/R$. Referring now to FIGURE 3, the attachment angle $\alpha$ is defined as 180° plus angle $\phi$. Angle $\phi$ is defined as the angle between a line connecting output axis OA and the end 43 of flex lead 50 attached to gimbal terminal 40 and a line connecting the center of radius 42 of flex lead 50 and end 43 of flex lead 50. The attachment ratio is defined as $L/R$, where L equals the distance between end 43 of flex lead 50 and the OA, and R equals the radius of curvature of flex lead 50. When the flex lead is not shaped as a segment of a circle R equals one-half the distance between the rotatable end of the flex lead and the non-rotatable end of the flex lead. Thus, the attachment angle $\alpha$ and the attachment ratio $L/R$ completely define the end points of flexible leads 50

It is clear that if the two end points of flexible lead 50 were located in the same plane, for example the plane of the drawing in FIGURE 3, it would be impossible to utilize more than a single flex lead in a sensitive instrument such as gyro 10. Consequently, it is necessary to further position the end points of flex lead 50 in order to allow a plurality of similar flex leads to be connected between gimbal element 12 and housing 11. This is accomplished by axially spacing the end points of flex lead 50 along output axis OA. In the embodiment illustrated in FIGURES 1–3, flex lead 50 has a helical shape. Axially spacing ends 43 and 51 of flex lead 50 subjects flex lead 50 to a slight torsional strain. However, the elastic restraint in torsion of flex lead 50 is substantially less than in bending. The net result is that the slight torsional strain has a negligible effect upon the elastic restraint of flex lead 50.

Figure 2:
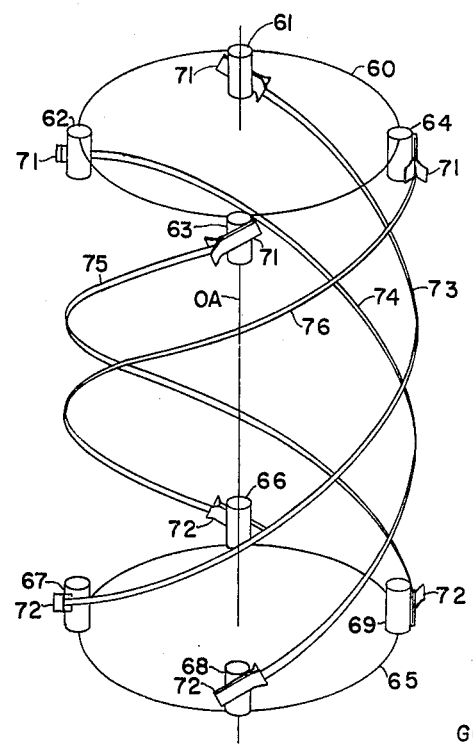
FIGURE 2 is an enlarged schematic illustration of the unique flexible leads utilized in the gyroscope illustrated in FIGURE 1.

FIGURE 2 illustrates four flexible leads in a perspective view. A rotatable element 60 (or gimbal element) is schematically represented. Four terminal elements, equally angularly spaced about axis OA are located upon rotatable element 60 and identified by reference numerals 61, 62, 63 and 64 respectively. A non-rotatable element 65 (or housing means) is also schematically represented. Four terminal elements 66, 67, 68 and 69 are positioned upon non-rotatable element 65 and are equally angularly spaced about an axis OA. A flex lead clip 71 is rigidly attached to each of the terminals located upon rotatable element 60. A flex lead clip 72 is rigidly attached to each of the four terminal elements located upon non-rotatable element 65. It should be noted that terminal clips 71 are inclined at an angle of approximately 30° towards element 65 and that terminal clips 71 are inclined at an angle of approximately 30° towards element 60.

A flexible lead 73 connects terminal 61 to terminal 67. A flexible lead 74 connects terminal 62 to terminal 68. A flexible lead 75 connects terminal 63 to terminal 69. A flex lead 76 connects terminal 64 to terminal 66. As is evident from FIGURE 2, flexible leads 73 through 76 are spaced apart from one another so as to allow limited rotation of element 60 relative to element 65 without physical contact of the flexible leads. Each of the flexible leads 73 through 76 partially surrounds output axis OA and each extends 270° about its own center of radius. The angle through which the flex lead extends about axis OA is identified by angle $\theta$ in FIGURE 3, and will vary as the attachment ratio $L/R$ is varied.

From the description of the applicant's unique flex lead with reference to FIGURES 1–3 it is clear that attachment angle $\alpha$ and attachment ratio $L/R$ define the radial position of the ends of the flex lead. In FIGURE 3 attachment angle $\alpha=192°$ and attachment ratio $L/R=1.9$. Theoretical and experimental studies indicate excellent performance is obtained when attachment angle $\alpha$ has a value between 160° and 360° and attachment ratio $L/R$ has a value between .5 and 1.6.

Tests performed on a gyro utilizing the applicant's unique flex lead illustrated a vast improvement in performance of the gyro in comparison with tests performed on the same gyro utilizing the prior art type of flex 54 illustrated in FIGURE 3. The improved performance of the gyro was due to the significant reduction in torques applied to the gimbal element by the applicant's unique flex lead. More specifically the utilization of the applicant's flex lead resulted in: (1) a reduction of elastic restraint by a factor of 10; (2) a reduction of reaction torques by a factor of at least 3; (3) a reduction of deformation torques by a factor of at least 3; and (4) a reduction of hysteresis effects by a factor of at least 3. In addition, no acceleration sensitive flex lead torques are present since the center of mass of each flex lead lies upon the axis of rotation. All of these improvements were obtained solely by utilizing the applicant's unique flex lead. The reduction of the elastic restraint is of prime importance, of all the flex lead torques affecting the sensitivity and accuracy of the gyro. It can be shown that the elastic restraint of a flex lead is proportional to the elastic modulus, the attachment angle, and the attachment ratio. Consequently, the desired value of elastic restraint can be obtained for each application by choosing the appropriate variables.

The elastic restraint of a flexible lead is substantially unaffected by the shape of the particular flex lead. A triangular shaped flex lead has essentially the same elastic restraint as a similar size flex lead shaped in a semicircle.

Figure 4:
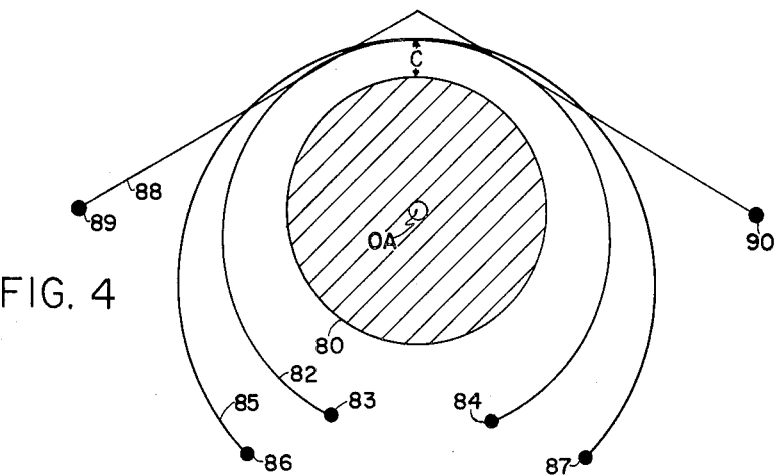
FIGURE 4 is an enlarged schematic illustration of alternate embodiments of the applicant's invention.

FIGURE 4 is a schematic representation of various attachment angles, attachment ratios, and flex lead shapes which may be utilized. A flex lead 82 connecting terminals 83 and 84 has an attachment angle of 183° and an attachment ratio of 1.12. Flex lead 82 extends 315° around its center of radius. A flex lead 85 connecting terminals 86 and 87 has an attachment angle of 190° and an attachment ratio of 1.25. A triangular shaped flex lead 88 connecting terminals 89 and 90 has an attachment angle of 180° and an attachment ratio of 1.

Thus, the applicant has provided a unique flexible lead wherein electrical energy is transferred from a stationary element to an element movable relative to an axis with substantially no effect upon the rotation therebetween. The applicant's unique flex lead provides minimum elastic restraint, minimum reaction torque, and minimum deformation torque upon the rotatable element. Furthermore, the applicant's unique flex lead substantially reduces hysteresis effects. The applicant's flex lead also substantially eliminates acceleration sensitive flex lead torques. In one particular embodiment of the applicant's invention, the flexible leads take the form of a helix partially surrounding the rotational axis.

Although the invention has been described and illustrated in detail, and is to be clearly understood that the same is by way of illustration and example only and is not to be taken by way of limitation, the spirit and scope of this invention being limited only by the terms of the appended claims.

What is claimed is:
1. In gyroscope:
housing means;
gimbal means mounted within said housing means for limited rotation about an axis;
a first terminal element attached to said housing means;
a second terminal element axially spaced from said first terminal element and attached to said gimbal means;
and a flexible lead electrically connecting said first terminal element and said second terminal element, said flexible lead having an attachment angle greater than 160° and less than 360°, said flexible lead having its center of mass located substantially upon said axis, and said flexible lead having an attachment ratio greater than .5 and less than 1.6.
2. In a sensitive instrument:
housing means;
a movable element, said element being mounted in said housing means for limited movement relative to an axis;
and a conductor electrically connecting said housing means to said element, said conductor having an attachment angle between 160° and 360°, said conductor having its center of mass located substantially upon said axis, and said conductor having an attachment ratio between .5 and 1.6.
3. In a sensitive instrument:
housing means;
a movable element mounted in said housing means for movement relative to an axis;
and a plurality of flexible leads electrically connecting said housing means to said element, each of said plurality of flexible leads having one end axially spaced from the other end, each of said plurality of flexible leads having an attachment angle greater than 160° and less than 360°, and each of said plurality of flexible leads having an attachment ratio greater than .5 and less than 1.6.
4. In a sensitive instrument:
housing means;
a movable element, said element being mounted in said housing means for movement relative to an axis;
and a flexible lead electrically connecting said housing means to said element, said flexible lead having one end axially spaced from the other end, said flexible lead having an attachment angle greater than 160° and less than 360°, and said flexible lead having an attachment ratio greater than .5 and less than 1.6.

No references cited.

ARTHUR L. LA POINT, *Primary Examiner.*
S. T. KRAWCZEWICZ, *Assistant Examiner.*